United States Patent [19]

Lizzio

[11] 4,433,763

[45] Feb. 28, 1984

[54] SOLENOID OPERATED SERVICE BRAKE APPLICATION UNIT

[76] Inventor: Vincent P. Lizzio, 45 Moorland Dr., Grosse Pointe Shores, Mich. 48236

[21] Appl. No.: 365,521

[22] Filed: Jun. 2, 1982

[51] Int. Cl.³ .......................................... B60K 41/26
[52] U.S. Cl. ..................... 192/4 A; 180/271
[58] Field of Search .................... 192/4 A, 9; 180/271

[56] References Cited

U.S. PATENT DOCUMENTS

| | | | |
|---|---|---|---|
| 2,781,117 | 2/1957 | McLeod | 192/4 A |
| 2,821,275 | 1/1958 | Martin | 192/4 A |
| 2,867,310 | 1/1959 | Martin | 192/4 A |
| 2,912,085 | 11/1959 | DeLorean | 192/4 A |

Primary Examiner—George H. Krizmanich

Attorney, Agent, or Firm—Dolgorukov & Dolgorukov

[57] ABSTRACT

A device that will automatically apply the service brake of a motor vehicle using the vacuum supplied by the engine of said vehicle when the transmission lever is placed in a first predetermined position, such as the park position for automatic transmission vehicles, or in neutral for gear shift equipped vehicles. The apparatus moves a lever arm down to engage the service brake after it is applied, and holds it in its applied position as long as the transmission is in, for example, the park position. When it is desired to again move the motor vehicle, the service brake is applied with a slightly above normal pressure, the service brake is released, and the car is started, and the operator may then move the vehicle.

15 Claims, 7 Drawing Figures

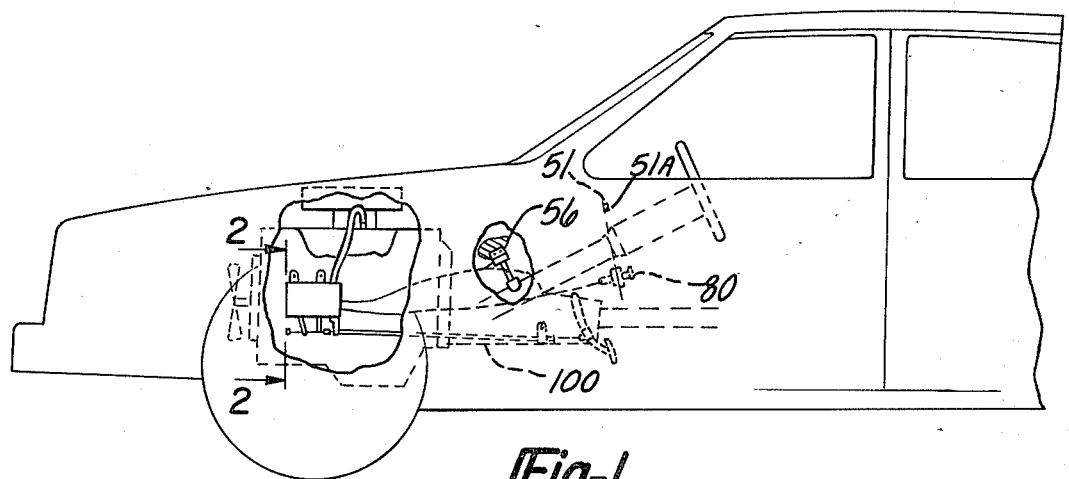
Fig-1
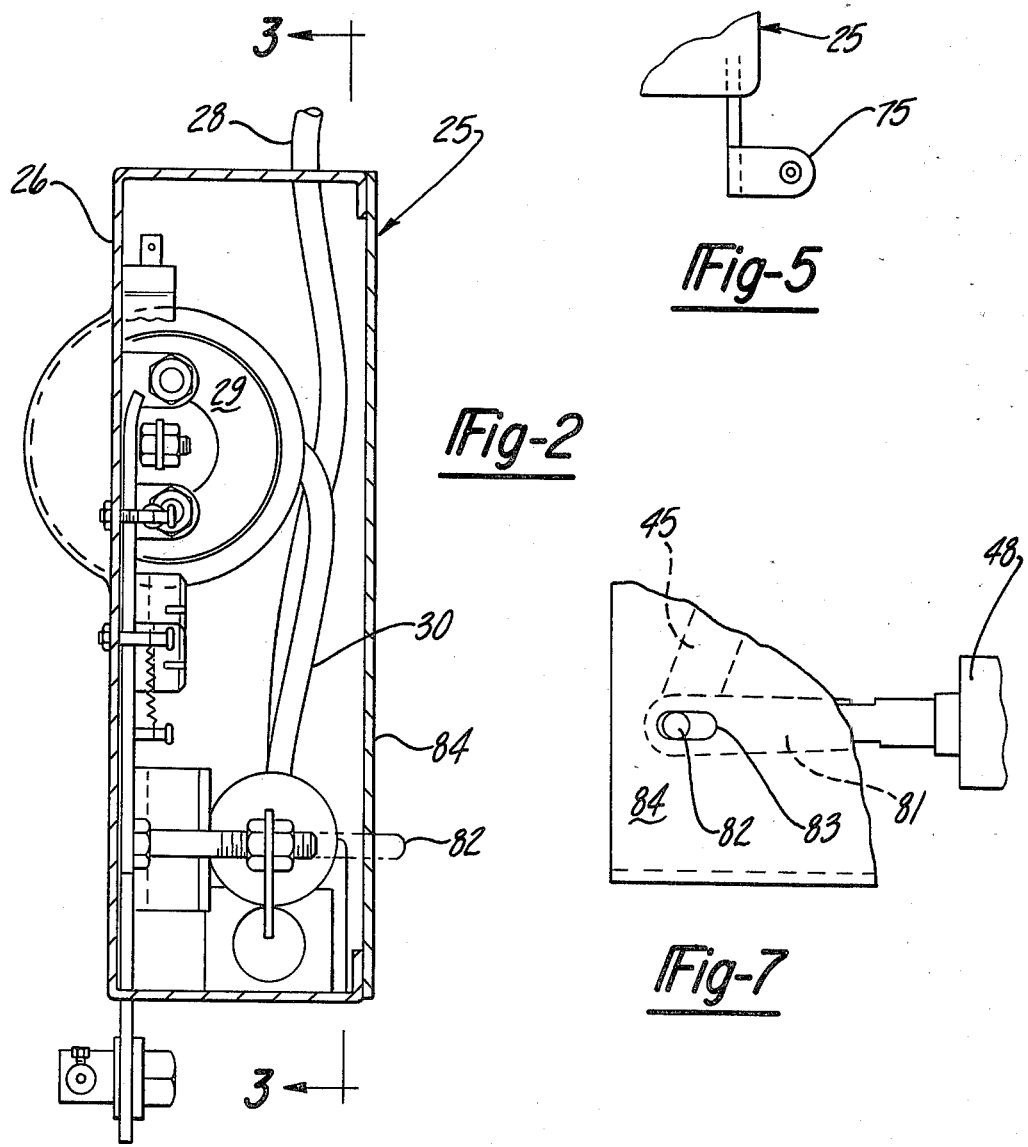
Fig-2
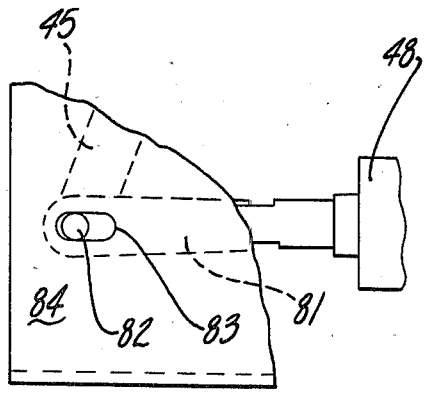
Fig-5
Fig-7

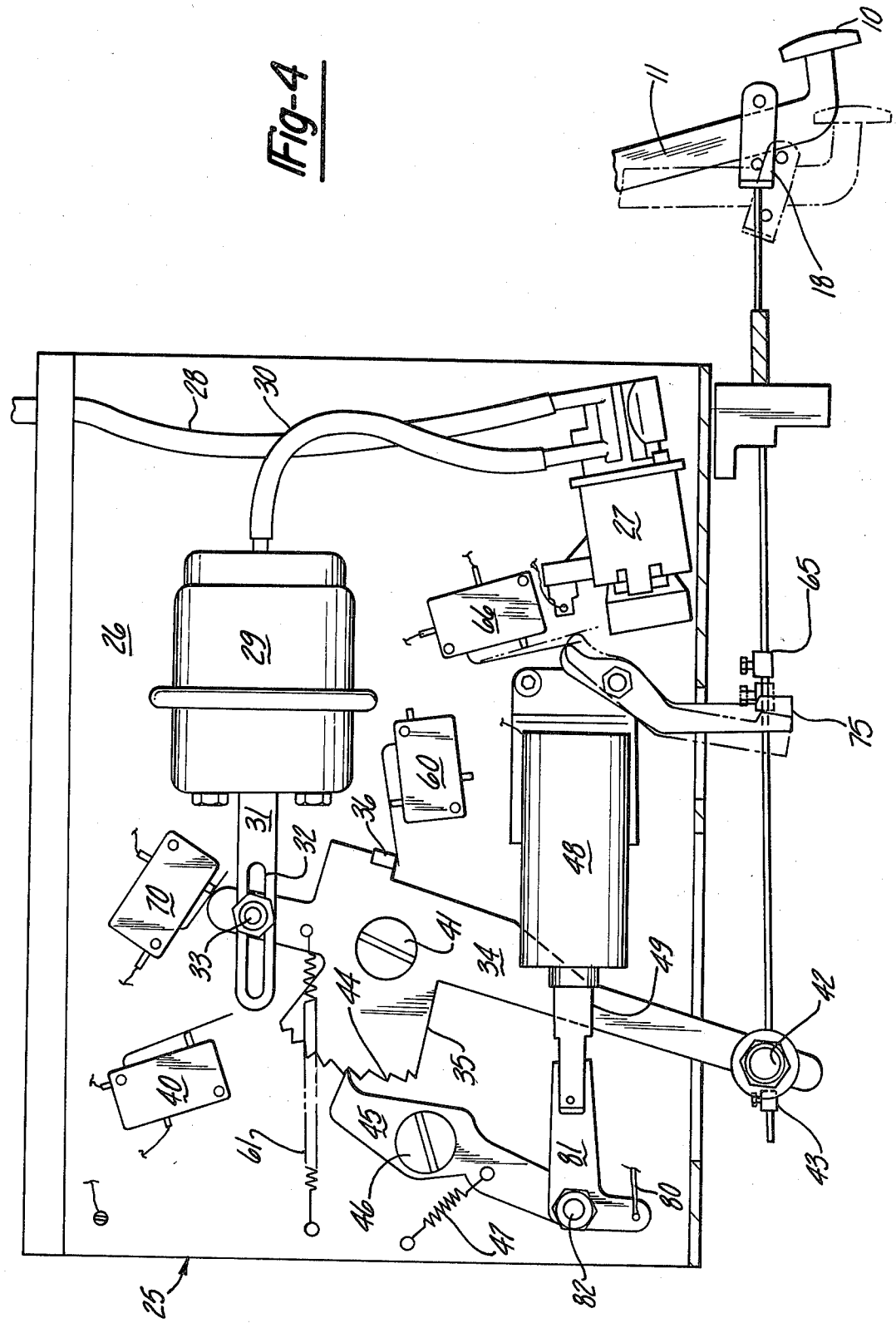

SOLENOID OPERATED SERVICE BRAKE APPLICATION UNIT

The present application relates to my earlier U.S. Pat. No. 4,281,736, dated Aug. 4, 1981, entitled "Method and Apparatus for Automatically Applying and Releasing Automotive Type Parking Brakes". The specification of said earlier United States Letters Patent is specifically incorporated herein by reference.

The present invention relates to a device for immobilizing vehicles when they are parked, and more particularly to a device which will automatically apply the service brake of a vehicle when its transmission is placed in a first predetermined position. My earlier United States patent discusses the problems that became evident from the time the automobile was in its infancy when it was not equipped with a parking brake, or a like device, and illustrates what would happen when the car, having only a manual transmission, was held stationary only by leaving the transmission in one of its geared positions.

Also discussed in my earlier patent, and claimed at one time, was a device for applying the service brake of a motor vehicle in an automatic fashion. However, even though the need for the service brake application unit arose from all the same problems discussed in said earlier patent, I did not actively prosecute the claims directed to the service brake application unit because it became evident to me by the time said earlier patent was to issue, that because of the position of the service brake of the automobile, and the already existing need for modification of sheet metal thereon to install my earlier disclosed device, the trend to ever smaller cars, and the need to make devices such as mine ever more inexpensive for competitive purposes, there was a much better way to provide for a service brake application unit.

Thus, one of the objects of the present invention is to provide an apparatus which allows for the application of the service brake of an automotive-type vehicle in a simple and inexpensive manner.

Another object of the present invention is to provide a service brake application unit of the foregoing nature which can be installed in an automotive vehicle without major modification of the sheet metal thereof.

Another object of the present invention is to provide a service brake application unit which may be mounted in a remote location from the service brake pedal of an automotive-type vehicle.

Another object of the present invention is to automatically keep the service brakes of a vehicle applied when the automatic transmission lever of a vehicle equipped with an automatic transmission is placed in a first predetermined position after said service brake is applied by the vehicle operator.

Another object of the present invention is to provide a method and apparatus to engage the service brake of a manual transmission vehicle when its gear shift lever is put in a first predetermined position, after said service brake is applied by the vehicle operator.

A still further object of the present invention is to provide an apparatus of the foregoing nature which can either be installed as original equipment on a motor vehicle, or be embodied in a unit which can be installed on cars already in use.

Another object of the present invention is to provide an apparatus of the foregoing nature which will automatically release the service brake when the operator starts the vehicle in which my device is installed, and applied a little extra force to the service brake of the motor vehicle.

Another object of the present invention is to provide an apparatus for applying the service brake of a vehicle which will automatically release the service brake when a switch is manually operated by the operator of the motor vehicle.

A still further object of the present invention is to provide a device for automatically applying the service brake of a motor vehicle, wherein such brakes are automatically released when the transmission lever of the vehicle so equipped is put in its neutral position.

Another object of the present invention is to provide an apparatus of the foregoing nature which will automatically release the service brake when the operator starts the vehicle in which my device is installed and applies a small additional force to the pedal of the service brake of the motor vehicle.

A further object of the present invention is to provide an apparatus of the foregoing nature which is relatively simple and inexpensive to manufacture, and is safe and foolproof in operation.

Further objects and advantages of this invention will be apparent from the following description and appended claims, reference being made to the accompanying drawings forming a part of the specification, wherein like reference characters designate corresponding parts in the several views.

FIG. 1 is a partially cutaway elevational view showing a construction embodying my invention mounted on the fender well of an automobile engine compartment.

FIG. 2 is a sectional view taken in the direction of the arrows along the section line 2—2 of FIG. 1.

FIG. 4 is an elevational view identical to that of FIG. 3, except that the portions of the construction embodying my invention are shown in the position they would occupy when the service brake of a motor vehicle has been applied.

FIG. 5 is a partial sectional view taken in the direction of the arrows along the section line 5—5 of FIG. 3.

FIG. 7 is a partial cutaway view showing the addition of a manual release to the construction shown in FIG. 4.

It is to be understood that the invention is not limited in its application to the details of construction and arrangement of parts illustrated in the accompanying drawings, since the invention is capable of other embodiments, and of being practiced or carried out in various ways within the scope of the claims. Also, it is to be understood that the phraseology and terminology employed herein is for the purposes of description, and not of limitation.

Figure 3:
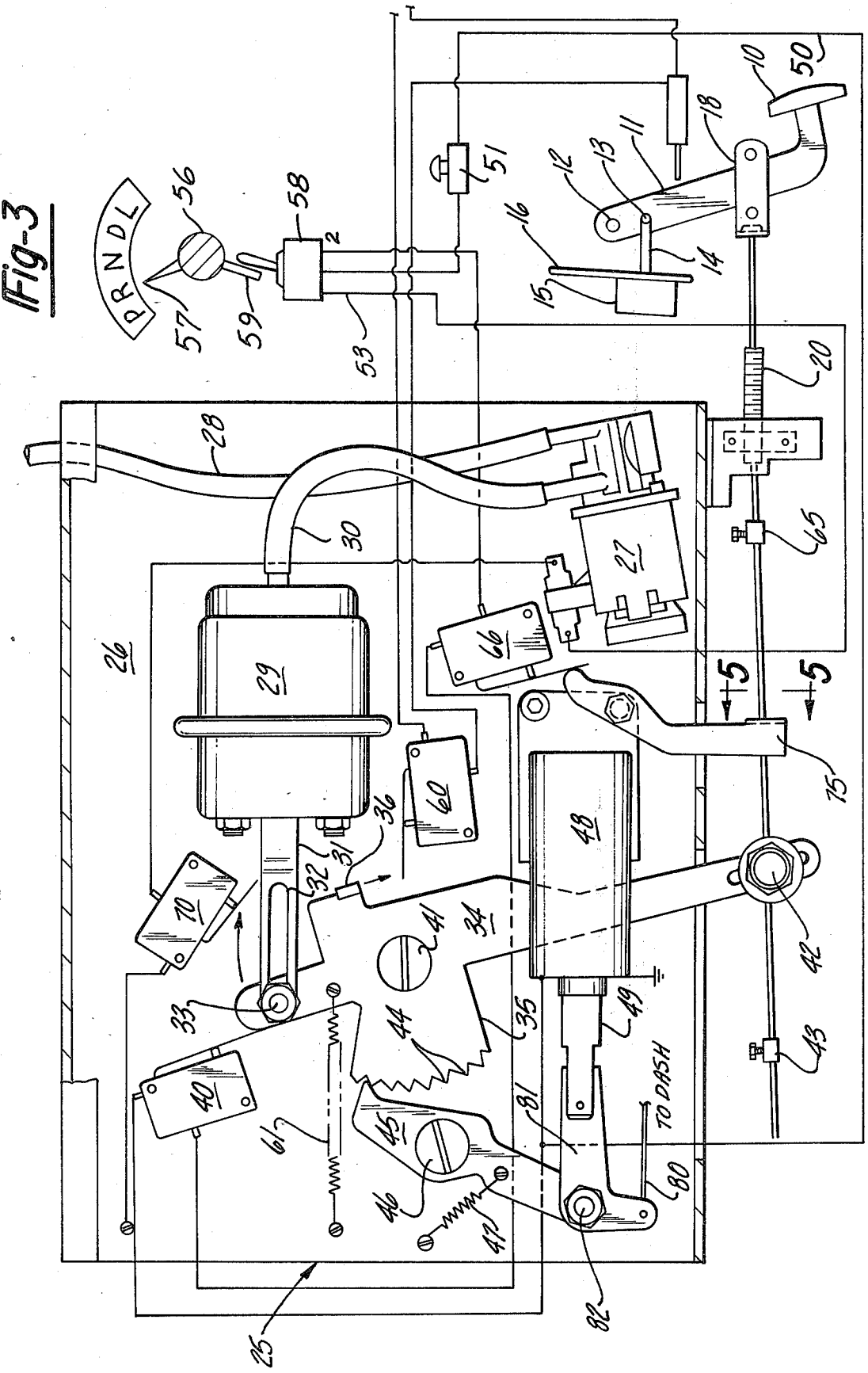
FIG. 3 is an elevational view of a construction embodying the present invention with the service brake in its released position.
Figure 6:
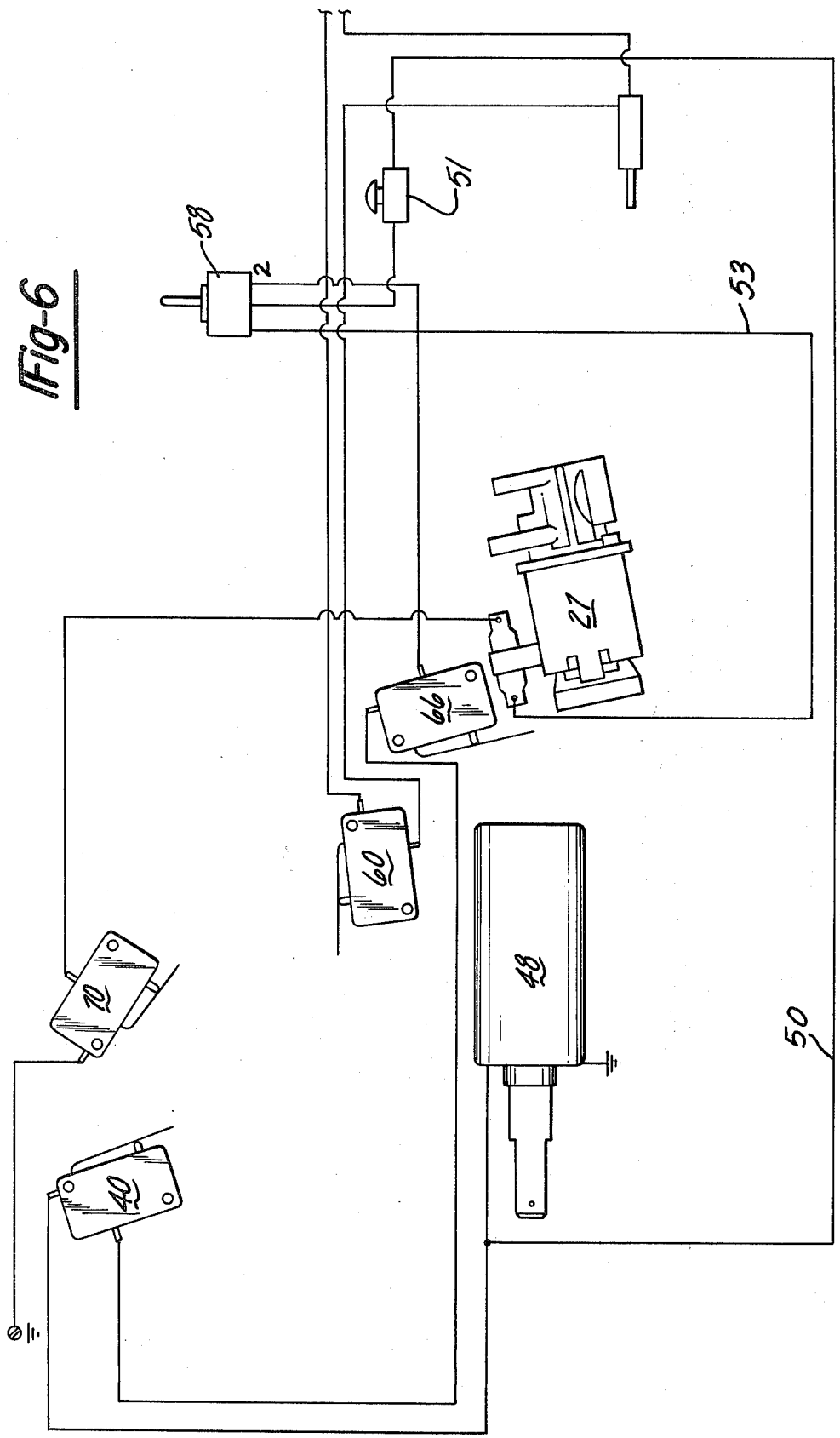
FIG. 6 is a schematic diagram showing the wiring connections of the construction illustrated in FIG. 4.

Referring now to FIGS. 1-3, there is shown a elevational view of a construction embodying the present invention. There is also shown the standard service brake pedal 10 mounted to the service brake pedal arm 11 which is mounted to the motor vehicle by the pivot device 12 in a manner well known in the art.

The master cylinder 15 is mounted to the fire wall 16 in a conventional manner and is pivotally connected to the pedal arm 11 by the second pivot device 13 and the master cylinder rod 14. When the brake pedal 10 is depressed, the service brakes of the motor vehicle are applied in the conventional manner. Since the standard hydraulic braking system is well known in the art, it is not believed necessary to describe it herein in detail. However, it should be understood that, while the preferred embodiment of my invention is applicable to a standard hydraulic brake system which appears on manual and automatic transmission cars, any type of vehicle brake system, whether hydraulic, electrical, or mechanical, which is operated by the application of a brake pedal, is within the scope of the intended uses of my device.

A collar 18 is provided about the lower end of the service brake pedal arm 11. A flexible cable 20 of any suitable type, such as a Bowden cable, is attached to the collar 18 by any suitable means, such as welding, fastening, riveting, etc. This flexible cable is then attached by means to be described to my vacuum operated service brake application unit generally designated by the number 25.

The unit itself consists of a mounting plate which may be mounted to the vehicle in any suitable location such as the fender well, fire wall, engine, passenger compartment, trunk, or any place in the vehicle that may be conveniently reached by means of a flexible cable without introducing operability problems to such cable. Mounted to the mounting plate 26 is a means to control vacuum supplied from a source of vacuum, such as the vehicle engine. A vacuum electric solenoid 27 connected by means of a first hollow conduit 28 to a source of engine vacuum provides this means.

A means to supply a reciprocal movement, such as a vacuum diaphragm 29, is mounted to the mounting plate 26 and connected by means of a second hollow conduit 30 to the vacuum electric solenoid. The vacuum diaphragm 29 is adapted to operate the diaphragm rod 31 retracting it when vacuum from the engine is supplied to the diaphragm 29 through the vacuum electric solenoid 27, and releasing the rod, or extending it, when vacuum is not supplied.

The diaphragm rod is shown in FIG. 1 in its extended position and having a slot 32 therein which fits over the pin assembly 33, which is fixedly mounted to the lever arm 34. The lever arm 34 is formed integrally on the quadrant gear 35, which is rotatably mounted to the mounting plate 26 by means of the gear shaft 41.

A pin assembly 42 is rotatably mounted to the opposite end of the lever arm 34 and the other end of the Bowden cable 20 is passed through a hole therein. The cable 20 is prevented from slipping out of the hole in the second pin assembly 42 by the adjustable stop 43.

Provided about the periphery of the quadrant gear 35 are a plurality of ratchet teeth 44 adapted to engage the ratchet 45 which is rotatably mounted to the mounting plate 26 by the ratchet pin assembly 46. The opposite end of the ratchet 45 is connected to the ratchet solenoid 48 by way of the solenoid shaft 49, ratchet link 81 and the bolt and nut assembly 82. The ratchet spring 47 interposed between the mounting plate 26 and the ratchet 45 keeps the ratchet biased against the ratchet teeth 44 to engage the gear at all times except when the ratchet solenoid 48 is activated. The ratchet solenoid 48 is connected, by means of a wire 50, to a switch means 51, for purposes to be described below.

The vacuum electric solenoid 27 is connected by second wire 53 to terminal one on transmission operation limit switch 58 adjacent transmission lever column 56. The printer 57 shows the driver which transmission range he is in, and a dog 59 is mounted on the transmission lever column 56 in such a position that when the pointer 57 points to the "P", indicating the park position, the dog 59 depresses the limit switch 58. This limit switch then allows current to pass to terminal one of the vacuum electric solenoid. Since the normally on vacuum electric solenoid switch 70 is on at this time, the circuit from ground to vacuum electric solenoid 27 is completed, allowing engine vacuum to pass through the first hollow conduit 28, the vacuum electric solenoid 27, and the second hollow conduit 30 to the vacuum diaphragm 29, rotating lever arm 34 clockwise.

Another limit switch, the brake light limit switch 60, is mounted adjacent the quadrant gear 35 and is adapted to be operated by quadrant gear extension 36 upon sufficient rotation of the quadrant gear 35 to turn off the normally on micro-switch, thereby keeping the brake lights off as long as the lever arm 34 is in its rotated position.

In this standard version of my system, as illustrated for an automatic transmission (100) equipped vehicle, the driver of the vehicle, following the normal sequence of operations followed in bringing the car to rest and placing it in a condition for storage, will move the transmission lever column 56 in a manner to cause it to rotate sufficiently so that the pointer 57 points to the park position. This will cause the dog 59 to operate the limit switch 58 to cause current to pass through the second wire 53 to the vacuum electric solenoid 27. This allows engine vacuum to pass through the first hollow conduit 28, the vacuum electric solenoid 27, and the second hollow conduit 30 to the vacuum diaphragm 29.

In a manner well known in the art, vacuum applied to the vacuum diaphragm 29 will cause the diaphragm rod to retract into the vacuum diaphragm 29 in an axial direction. Since the slot 32 in the diaphragm rod 31 moves axially with the diaphragm 29, it will also move in an axial direction causing the end thereof to strike the first pin 33 and cause clockwise rotation of the lever arm 34 against the lever arm spring 61.

Since the lever arm is fixedly mounted to the quadrant gear 35, the quadrant gear 35 will also be made to rotate in a clockwise direction until the diaphragm rod travels its maximum distance. This clockwise rotation of the lever arm 34, providing the adjustable sleeve 43 is tightly affixed to the flexible cable 20, will cause that cable to retract and pull down on the service brake pedal arm 11 through the collar 18, causing the master cylinder rod to be forced into the master cylinder 15, thus applying, in a manner well known in the art, the service brakes of the motor vehicle, locking all four wheels and maintaining the vehicle stationary automatically as a passive safety feature for any automotive-type vehicle.

In order that the engine vacuum not be drained, so that it may be stored for other needed purposes, when the lever arm 34 has made its maximum rotation the upper portion of the lever arm will strike the second micro-switch 70, interrupting the circuit powering the vacuum electric solenoid 27, cutting off the supply of vacuum to the diaphragm 29. Because of the engagement of the ratchet 45 with the ratchet 44, the service brake 10 will remain applied even after the cutting off of the vacuum supplied to the diaphragm 29. In this manner, assuming that the braking system is in reasonably good condition, my improved service brake application device will maintain the service brakes of the vehicle in a locked condition for an indefinite period of time until the motor vehicle owner returns.

It should be understood that the spatial relationship of the vacuum electric solenoid switch 70 and the brake light limit switch is important to the operation of my invention. The solenoid switch 70 and the limit switch 60 must both be placed about lever arm 34 so that they operated substantially simultaneously and both remain in their off positions as long as lever arm 34 is retained in its rotated position. This is important because if switch 70 is not closed, the vacuum diaphragm 29 will keep oscillating, and the brake lights will not turn off.

If the motor vehicle is equipped with a manual shift transmission, the dog 59 must be placed in some position on the transmission lever column 56 so that when the gear shift lever is put in the desired first predetermined position, the limit switch 58 will be operated.

Since the mechanical design of service brake units varies from car-to-car, different brakes may require different amounts of compression of the brake pedal arm to lock all four wheels. Also, in older cars, the varying mechanical condition of the braking system may require various movements of the brake pedal 10 to lock all four wheels of the vehicle.

In order to allow my system to be used on new and old vehicles requiring various movements of the brake pedal, the adjustable sleeve 43 is provided about the flexible part of the cable 20. Since the lever arm 34 will rotate much more than is needed, there is generally some space provided between the adjustable sleeve 43 and the second pin 42, and it is this amount of space which may be adjusted by means of the adjustable sleeve 43 to provide the proper movement of the service brake pedal 10 when the lever arm 34 has reached its full amount of rotation.

I have now described how my improved service brake application device automatically maintains the service brakes of a vehicle in an applied position when the gear shift lever thereof, whether automatic or manual, is placed in a first predetermined position. It is also necessary, of course, to have the restraint on the service brake removed when the operator of the motor vehicle desires to remove it from its storage condition and resume its operation on the highway.

Many types of service brake releasing means can be used. In the simplest version of my system, there is provided a service brake releasing means in the form of a switch means 51 (FIG. 1) provided on the dashboard 52 of the vehicle. When the operator returns to the vehicle, he will take the necessary steps, including turning on the ignition switch, which will supply power to the system, and starting the vehicle's engine, which will supply vacuum to the system.

In the manual version of the system, the switch means 51 is connected by the first wire 50 to the ratchet solenoid 48. When the pushbutton means 51, which for safety purposes may be illuminated by a red light 51A when the ignition is turned on, and the switch is still in its normally "off" condition, is depressed, current will be supplied via the first wire 50 to the ratchet solenoid 48. When current is supplied to the solenoid, the solenoid shaft 49 will retract causing a counterclockwise rotation of the ratchet 45 about the ratchet pin 46.

Since, in its rotation position, the lever arm 34 has expanded the lever arm spring 61 and placed tension thereon, the tension in the spring, together with the tension on the brake pedal, provided by the force of the master cylinder 15, will cause the upward movement of the service brake pedal 10 and the releasing of the brakes on all four wheels of the motor vehicle, which will allow it to be operated in its normal manner.

It should be understood that instead of the manual operation of a switch means 51, automatic operation of the service brake releasing means may also be provided for.

For a manual transmission vehicle, a similar placement of the dog would be made, depending on what the second predetermined desired position would be.

Another alternative service brake release means is to provide a second adjustable sleeve 65 on the movable portion of the cable 20 adapted to operate a cable operated limit switch 66, which may replace the limit switch 51 if desired. This would be properly adjusted so that upon application of a slight additional pressure over that which the operator initially applied to the service brake pedal 10 when in its depressed position, shown by the phantom lines in FIG. 4, the switch would be operated, supplying current to the ratchet solenoid 48, resulting in the release of the parking brake.

In this embodiment, the cable operated limit switch 66, which is connected to terminal two of the transmission operated limit switch 58, is also wired in series with the micro-switch 40 so that upon the striking of the second adjustable sleeve 65 on the toggle 75, the cable operated limit switch 66 would be operated and current would pass through said switch, through micro-switch 40 to the solenoid 48, retracting solenoid 49 and causing the lever arm 34 to rotate counterclockwise, thus releasing the service brakes. A close-up view of the toggle 75 is shown in FIG. 5. It is felt that this method of release of the service brake may be particularly appropriate for manual transmission equipped cars.

For safety purposes, should the electrical or vacuum system of the car fail to operate, I provide for manual release of the service brake by means of the safety cable 80 being attached at one end to the ratchet link 81, which connects the solenoid shaft 49 to the ratchet 45. The other end of the safety cable 80 may be attached to the dashboard as indicated in FIG. 1. It can be seen that the applying of force through the cable 80 will cause the ratchet 45 to rotate in a counterclockwise position, just as the application of the force by the solenoid 48 did, resulting in the release of the lever arm 34 to rotate in a counterclockwise position and release the parking brake.

For ease of understanding of the invention, my improved service brake application unit 25 is shown in its applied position in FIG. 4. It shold be understood that like numerals are applied to the identical parts in the two views.

Also, as shown in FIG. 7, a short manual release may be provided. In this instance the bolt and nut assembly 82 connecting the link 81 and the ratchet 45 may simply be extended through a slot 83 in the cover 84 of the unit to move such assembly by manual pressure on the bolt and nut assembly 82 to cause the release of the ratchet 45 and the release of the unit.

To provide for illumination of light 51A in switch 51, an additional switch 90 is provided, and is wired as shown in FIGS. 3 and 4.

Thus, by abandoning my earlier motor driven parking brake application unit, and other devices which have been tried previously in the art, I have provided a new and novel apparatus for automatically applying the service brake of a motor vehicle which is simple in construction and which may be mounted in any practicable location in the motor vehicle without major modification thereto.

I claim:

1. A method for an application and release of the service brake of an automotive-type transmission equipped vehicle having a transmission selector level after the operator of said vehicle has brought the vehicle to a stop by application of pressure to said service brake, said method including the steps of:
   (a) placing the transmission selector lever of said vehicle in a first predetermined position while pressure is still being applied to said service brake;
   (b) causing a restraining means to apply force to said service brake and keep said force applied while said transmission selector lever is in said first predetermined position, thereby keeping the service brake of said vehicle applied; and
   (c) causing said service brake to remain applied until said operator places said transmission selector lever in a second predetermined position and applies a slight additional pressure, over that initially applied, to the service brake of said vehicle.

2. The method defined in claim 1, wherein said transmission is an automatic transmission.

3. The method defined in claim 2, wherein said first predetermined position is a park position.

4. The method defined in claim 3, wherein said second predetermined position is a position other than the park position.

5. A service brake application unit for use in a transmission equipped motor vehicle having a service brake and a service brake pedal arm, including means to keep the service brake of said motor vehicle applied when a transmission selector lever operatively mounted in said vehicle is placed in a first predetermined position after the operator of said motor vehicle has applied pressure to said service brake to bring said motor vehicle to a stop, and means to release said service brake when desired by the application of a slight additional force over that initially applied to said service brake by said operator, after said operator places said transmission selector lever in a second predetermined position.

6. The device defined in claim 5, wherein said service brake application unit includes a frame member having means to restrain the service brake pedal arm mounted thereon, and wherein said means to keep said service brakes applied include a transmission operated limit switch operatively mounted adjacent the transmission lever of said motor vehicle.

7. The device defined in claim 6, wherein said means to restrain said service brake pedal arm include a flexible collar attached to said service brake pedal arm, a flexible cable attached to said collar and means to apply a force to said flexible cable.

8. The device defined in claim 7, wherein said means to apply said force to said cable include a rotatable lever arm movably attached to said flexible cable and rotatably attached to the said frame member of said service brake application unit, and including a means to rotate and to restrain said rotatable lever arm.

9. The device defined in claim 8, wherein said means to rotate said lever arm include a vacuum diaphragm operably attached to said lever arm and mounted to said frame member of said service brake application unit, and including means to supply and control engine vacuum to said vacuum diaphragm.

10. The device defined in claim 9, wherein said means to supply vacuum to said vacuum diaphragm include a vacuum electric solenoid and a first vacuum electric solenoid switch and a micro-switch, both adapted to be operated by a portion of said lever arm, and a first hollow conduit connecting said vacuum electric solenoid with a source of said engine vacuum and a second hollow conduit connecting said vacuum diaphragm with said vacuum electric solenoid, adapted when said transmission operated limit switch is operated by a dog on said transmission lever column when said transmission lever is in said first predetermined position to supply vacuum to said diaphragm through said vacuum operated limit switch to rotate said lever arm in a first predetermined position to apply force to said service brake pedal through said flexible cable and said collar.

11. The device defined in claim 10, wherein said means to restrain the rotation of said lever arm include a plurality of ratchet teeth provided on a quandrant gear portion of said lever arm, said ratchet teeth being engaged by a ratchet rotatably mounted to said frame member of said service brake application unit, said ratchet being biased towards said ratchet teeth by a spring mounted at its one end to said frame member and at its other end to said ratchet.

12. The device defined in claim 11, wherein said means to release said service brakes include a ratchet solenoid mounted to said frame member, a ratchet solenoid shaft operated by said ratchet solenoid, a ratchet link operatively connected between said ratchet shaft and said ratchet, a switch means to supply an electric current to said ratchet solenoid, all adapted to disengage said ratchet from said quadrant gear and allow the release of said service brakes.

13. The device defined in claim 12, and including a brake light limit switch operatively mounted adjacent said quadrant gear and connected to the brake lights of a motor vehicle and adapted to be operated by said quadrant gear extension to deenergize said brake lights of said motor vehicle when said service brakes are applied.

14. The device defined in claim 13, wherein said means to release said service brake by the application of the slight additional force includes a cable operated limit switch electrically connected to said micro-switch, and said limit switch, and mounted to said frame member, a second adjustable sleeve mounted on said cable, a toggle mounted operatively adjacent said second adjustable sleeve and said cable operated limit switch and operating to supply current to said ratchet solenoid upon application of slight additional pressure to said service brake.

15. The method defined in claim 14, and including a safety cable attached to said ratchet link for manual release of the service brake.

* * * * *